United States Patent
Donovan

(10) Patent No.: US 6,768,493 B1
(45) Date of Patent: Jul. 27, 2004

(54) SYSTEM, METHOD AND ARTICLE OF MANUFACTURE FOR A COMPRESSED TEXTURE FORMAT THAT IS EFFICIENTLY ACCESSIBLE

(75) Inventor: Walter E. Donovan, Milpitas, CA (US)

(73) Assignee: nVIDIA Corporation, Santa Clara, CA (US)

( * ) Notice: Subject to any disclaimer, the term of this patent is extended or adjusted under 35 U.S.C. 154(b) by 597 days.

(21) Appl. No.: 09/586,552

(22) Filed: May 31, 2000

(51) Int. Cl.[7] .................................................. G09G 5/00
(52) U.S. Cl. ....................... 345/583; 345/555; 345/582; 345/587
(58) Field of Search ................................. 345/552, 583, 345/428, 582–588, 544, 555, 506, 564

(56) References Cited

U.S. PATENT DOCUMENTS

| 5,892,517 A | * | 4/1999 | Rich |
| 6,353,438 B1 | * | 3/2002 | Van Hook et al. |
| 6,452,602 B1 | * | 9/2002 | Morein |

* cited by examiner

*Primary Examiner*—Matt Bella
*Assistant Examiner*—Hau Nguyen
(74) *Attorney, Agent, or Firm*—Silicon Valley IP Group, PC; Kevin J. Zilka

(57) ABSTRACT

A system, method and article of manufacture are provided for efficient storage of texture data in memory for use with a computer graphics pipeline. Provided is a data structure including at least one compressed sub-block representing a group of texels in a predetermined image plane and at predetermined locations in a first and a second dimension in a texture map. A number of the sub-blocks is based on a depth of texture data in the texture map.

22 Claims, 4 Drawing Sheets

SYSTEM, METHOD AND ARTICLE OF MANUFACTURE FOR A COMPRESSED TEXTURE FORMAT THAT IS EFFICIENTLY ACCESSIBLE

FIELD OF THE INVENTION

The present invention relates to computer graphics, and more particularly to accessing texture data for texture mapping during computer graphics processing.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a line. All graphic pictures are formed with combinations of these graphic primitives. Many procedures may be utilized to perform graphic primitive rendering.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. Texture mapping is a relatively efficient technique for creating the appearance of a complex image without the tedium and the high computational cost of rendering the actual three dimensional detail that might be found on a surface of an object. In texture mapping, a source image known as the "texture" is mapped onto a surface in three dimensional space. The three dimensional surface is then mapped to the destination image. The destination image is then displayed on a graphic display screen. Examples of the texture of an object include the gravel on a highway or scuff marks on a wooden surface.

Many parameters have been texture mapped in conventional systems. Some of these parameters include surface color, specular reflection, normal vector perturbation, specularity, transparency, diffuse reflections, and shadows. In all of these cases, the texture map contains numerical values representing these parameters, stored in tabular form.

The number of indices used to access this table can vary. The number of indices used is defined as the dimensionality of the texture map. A one-dimensional texture is a function of a single index f(x). A two-dimensional texture is a function of two indices g(x, y). A three-dimensional texture is a function of three indices h(x, y, z). And so forth. The invention applies to three-dimensional and higher-dimensional textures.

Prior art FIG. 1 illustrates a three-dimensional texture map 100 that may be used during the texturing process. As shown, the texture map 100 includes a plurality of components, or texels 102, which form a three-dimensional grid. Such texels 102 extend in three directions, namely a x, y, and z direction. Each texel 102 contains the various parameters set forth earlier which aid in generating a realistic image.

During use, the various texels 102 of the texture map 100 are retrieved from memory as they are needed for mapping onto a surface in three-dimensional space. Often, the texels 102 are grouped into a fixed number of blocks which are in turn compressed. Compression generally reduces the amount of memory used to store the texture map 100 and also reduces the memory bandwidth used to access it. When such compression technique is employed, the entire block is first retrieved and decompressed after which the texels 102 are accessed for mapping purposes.

Prior art FIG. 2 illustrates the texture map 100 with the texels 102 being grouped into blocks 200–207 which have dimensions of four (4) texels by four (4) texels by four (4) texels. Each block 200–207 of texels 102 is positioned in one of a plurality of image block planes a, b, . . . which are spaced along the z-axis. In other words, the image planes differ in depth within the texture map 100.

With continuing reference to prior art FIG. 2, the manner in which the blocks 200–207 of texels 102 are traditionally stored in linear memory 208 is shown. The blocks 200–207 of image block planes a and b are compressed, and the compressed data is positioned contiguously in linear memory 208 in the corresponding blocks 200a–207c. In use, for example, block 200c may be retrieved from the linear memory 208 using an appropriate address. Thereafter, block 200c may be decompressed after which the texels 102 are retrieved for mapping purposes.

A significant problem associated with the system of prior art FIGS. 1–2 arises since this technique assumes that each image block plane has representative texels 102 in each of the blocks 200–207. Since this is often an erroneous assumption, this frequently results in a waste of memory space. By way of example, if the texture map 100 were only 2 texels deep, then half of the space of the blocks 200–203 would be unused.

Another significant problem associated with prior art as described in FIG. 2 is that the entire compressed block, 200c for example, needs to be retrieved in order to access any texels 102 within that block.

Yet another significant problem associated with prior art as described in FIG. 2 is that prior art generally defines a compression format for three-dimensional texture maps that is different enough from the compression format for two-dimensional texture maps that separate hardware needs to be built for the two formats.

There is therefore a need for a data structure and associated method of retrieval that requires less memory space, allows for more efficient retrieval of texture data during the texture mapping process, and requires less hardware overall.

DISCLOSURE OF THE INVENTION

A system, method and article of manufacture are provided for efficient storage of texture data in memory for use with a computer graphics pipeline. Provided is a data structure including at least one compressed sub-block representing a group of texels in a predetermined image plane and at predetermined locations in a first and a second dimension in a texture map. The number of sub-blocks is based on the depth of texture data in the texture map.

By allowing the versatile selection of the number of sub-blocks in the foregoing manner, a minimal required amount of sub-blocks need only be employed. This avoids wasted memory space which occurs when a predetermined, fixed number of sub-blocks is universally used. The present invention thus exploits the absence of texels in various dimensions of the texture map, and specifically tailors a depth of the sub-blocks to conform to the particular nature of the texture map.

In one embodiment of the present invention, the group of texels in the sub-block includes no more than four (4) texels in the first dimension, four (4) texels in the second dimension, and one (1) texel in the third dimension. Further, the number of sub-blocks in a block may include one (I), two (2), three (3), or four (4).

In another embodiment of the present invention, the sub-blocks together define a memory block with an associated block address. Still yet, the sub-blocks may each have an associated sub-block address. This allows each memory sub-block to be retrieved and decompressed individually. This may be accomplished using hardware equipped to decompress two-dimensional texture data.

In another embodiment of the present invention, a method is provided for efficient retrieval of texture data utilizing a data structure as set forth above. Such method first includes computing texture coordinates corresponding to predetermined texels required for performing texture operations in a computer graphics pipeline. Thereafter, an address is computed associated with at least one of the compressed sub-blocks associated with the texture coordinates. Further, at least one compressed sub-block is retrieved using the address. Thereafter, the retrieved compressed sub-block(s) is decompressed for accessing the predetermined texels.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior art

Prior art

DESCRIPTION OF THE PREFERRED EMBODIMENTS

Figure 1:
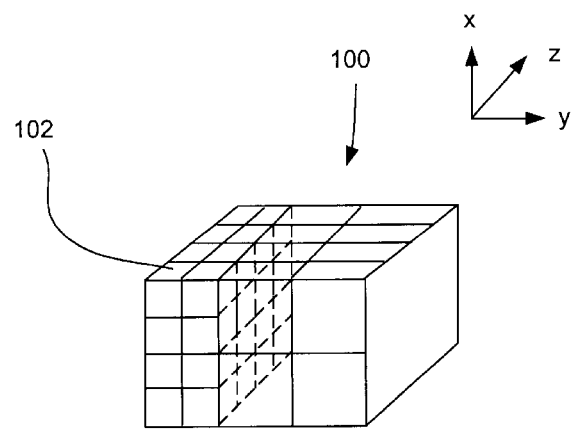
FIG. 1 illustrates a three-dimensional texture map that may be used during a prior art texturing process.
Figure 2:
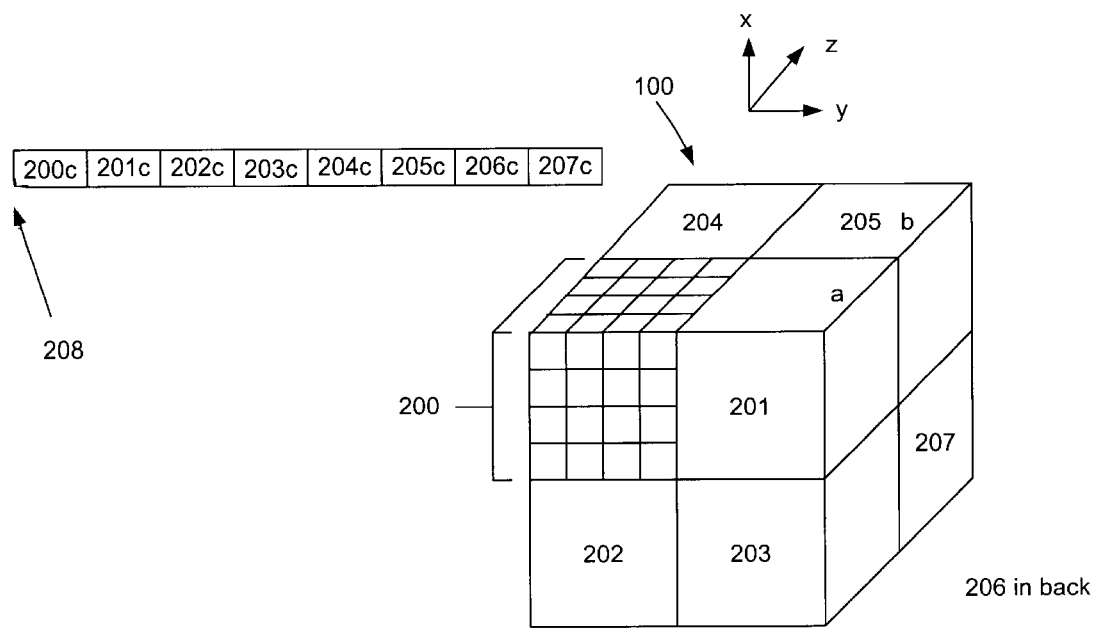
FIG. 2 illustrates the texels being grouped into a predetermined set of blocks which have dimensions of four (4) texels by four (4) texels by four (4) texels.
Figure 3:
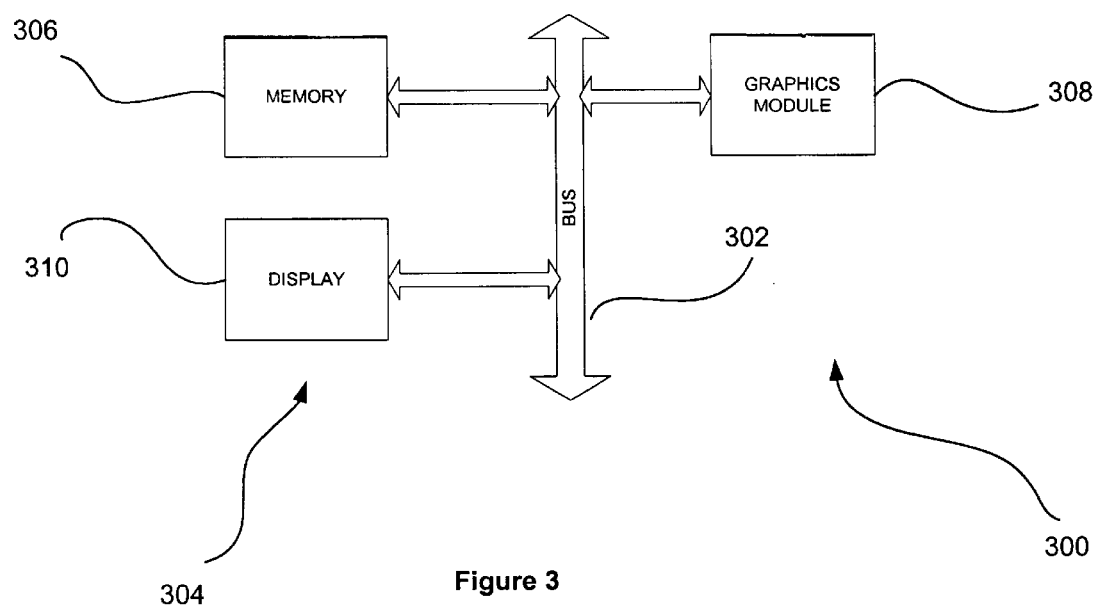
FIG. 3 is an exemplary hardware environment associated with one embodiment of the present invention.

FIG. 3 is an exemplary hardware environment 300 associated with one embodiment of the present invention. As shown, a bus 302 provides for communication between a plurality of components 304.Such components 304 include a memory module 306 adapted for storing various information that may be used during the course of computer graphics processing. In particular, such information may include texture data required for texturing during computer graphics rendering.

With continuing reference to FIG. 3, a graphics module 308 is also shown coupled to the bus 302. In operation, the graphics module 308 utilizes the information stored in the memory module 306 for the purpose of depicting images on a display 310. Of particular relevance to the present invention is the capability of the graphics module 308 to utilize the texture data stored in the memory module 306 for the purpose of displaying textures on the display 310 during rendering. To accomplish this, the graphics module 308 may include a graphics pipeline that is known in the art to include transform, lighting and rendering modules.

As set forth earlier, the texture data stored in the memory module 306 includes a three-dimensional texture map that may be used during a texturing process. Such texture map includes a plurality of components, or texels, which form a three-dimensional grid. During use, the various texels of the texture map are retrieved from the memory module 306 as they are needed for mapping onto a surface in three-dimensional space. The texels are grouped and compressed to minimize memory consumption and bandwidth used to access the texels. In use, the compressed texture data is first retrieved and decompressed, after which the texels are retrieved therefrom for mapping purposes.

In one embodiment, a particular type of compression may be employed in the context of the present invention. For example, a Microsoft Direct3D DX8 3-D compressed texture format may be employed. These formats are referenced by the labels DXT1,DXT3,or DXT5. These formats are block linear in nature and handle any size of two-dimensional texture map. The sub-block size for this format is 4×4×1.

It should be noted that the present invention may be used in conjunction with any type of compression scheme per the desires of the user. For example, the well- known two-dimensional FXT1 format may be employed. When using a format that does not have a 4×4×1 sub-block size (FXT1 uses a 8 wide×4 high×1 deep sub-block size), there are slight differences in the exact number of sub-blocks and their positioning as compared to the embodiment described herein. For example, one embodiment of a three-dimensional scheme based on FXT1 would use between one (1) and eight (8) sub-blocks as needed to fill up an 8×8×8 block.

Figure 4:
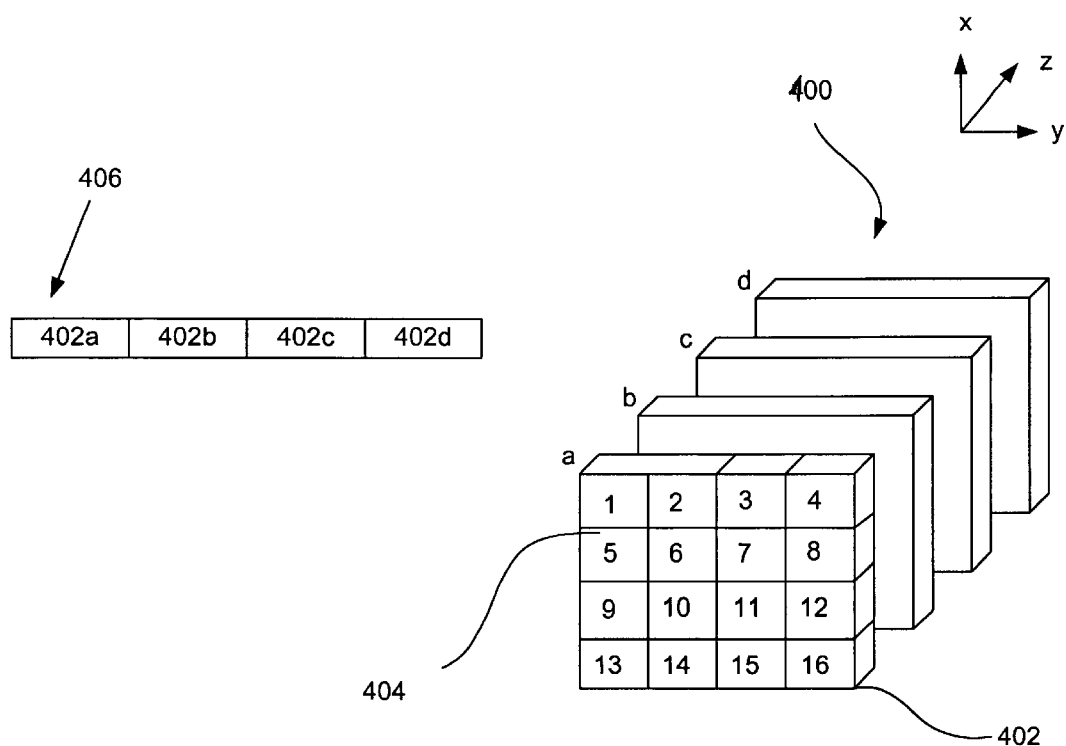
FIG. 4 illustrates a texture data block format for efficient retrieval of texture data during use of a computer graphics pipeline.

FIG. 4 illustrates a texture data block format for efficient storage and retrieval of texture data during use of a computer graphics pipeline. Included is a data structure 400 including at least one compressed sub-block 402 representing a group of texels 404 in a predetermined image plane and at predetermined locations in a first and a second dimension in a texture map. In one embodiment of the present invention, the group of texels includes no more than four (4) texels spanning in the first dimension and four (4) texels spanning in the second dimension.

Each sub-block 402 is positioned in one of a plurality of image planes that are designated as a, b, c, and d. Each image plane is spaced along the z-axis. In other words, the image planes a, b, c, and d differ in depth within the texture map. In the image planes, each sub-block 402 is positioned at a unique location along the x-axis and y-axis.

A number of the sub-blocks 402 is based on a depth of texture data in the texture map. As an option, the number of the sub-blocks 402 may include one (1), two (2), three (3), four (4), and/or 4*n, where n=any integer. As shown in FIG. 4, each sub-block 402 is stored individually in linear memory 406.

By utilizing a variable block size, the present technique thus occupies less space in memory by making more efficient use of memory bandwidth. This is a result of the fact that a memory read does not contain sub-blocks 402 of data that are not used. It should be noted that within each sub-block 402 there may be wasted memory due to the use of standard compressed texture formats which define a sub-block to always be 4×4×1 texels, regardless of whether there is 4 rows or 4 columns of texels at that point.

It should be understood that the format is not as efficient as a format that is tuned to match the memory page size by taking the sub-blocks 402 and rearranging them further into a super-block that matches the page size. However, for this format to be accepted as an industry-standard format, it could not be tied to any particular page size. In practice, as long as the page size is at least 64 bytes (assuming DXT1 . . . DXT5 is the sub-block compression scheme), it is reasonably efficient.

By providing sub-blocks 402 which can be read and decompressed individually, the present invention further makes more efficient use of memory bandwidth, as only the sub-blocks 402 that contain required data are read, rather than the entire block. Essentially, access to a 3-D texture map may follow a slice pattern through the map. If the slice only goes through some of the sub-blocks, only these need to be read.

With a texture map of width x height x depth texels in size, blocks may thus be defined that are one of various sizes, e.g. 4×4×4, 4×4×3, 4×4×2, or 4×4×1. Specifically, if depth=1, then the 4×4×1 size is selected. If depth=2, then the 4×4×2 size is selected. If depth=3, then the 4×4×3 size is selected. Otherwise, the 4×4×4 size is selected. The block sizes may not necessarily be affected by width or height—only by depth.

The 4×4×1 block contains one 4×4×1 sub-block. The 4×4×2 block format contains two 4×4×1 sub-blocks that differ in position by depth only. The 4×4×3 block format contains three 4×4×1 sub-blocks that differ in position by depth only. The 4×4×4 block format contains four 4×4×1 sub-blocks that differ in position by depth only. The format for the 4×4×1 sub-block may be designed to match the corresponding DXTn 4×4 block format (compressed to either 8 bytes or 16 bytes.) While a three-dimensional case has been set forth herein, it should be noted that the principles of the present invention may be employed in the context of greater dimensions, e.g. 4-D, 5-D, etc. Further, it should be noted that the principles of the present invention might be universally applied to applications dealing with memory pages of varying sizes.

The various sub-blocks 402 together define a memory block with an associated block address. Still yet, the sub-blocks 402 each have an associated sub-block address. This allows each memory sub-block 402 to be retrieved and decompressed individually. This may be accomplished using hardware equipped to decompress two-dimensional texture data.

The sub-blocks 402 thus use a format that matches an existing fixed-block-length 2-D compressed texture format. Since both 2-D and 3-D compressed textures are ideally supported, the present invention permits the decompression hardware, typically a fairly large and thus expensive circuit, to be used both for 2-D and 3-D. This saves chip area and cost.

Further, the compression scheme works with any existing fixed-block-length 2-D compressed texture format. It is easy to adapt hardware that has an existing 2-D compressed texture scheme to 3-D.

Figure 5:
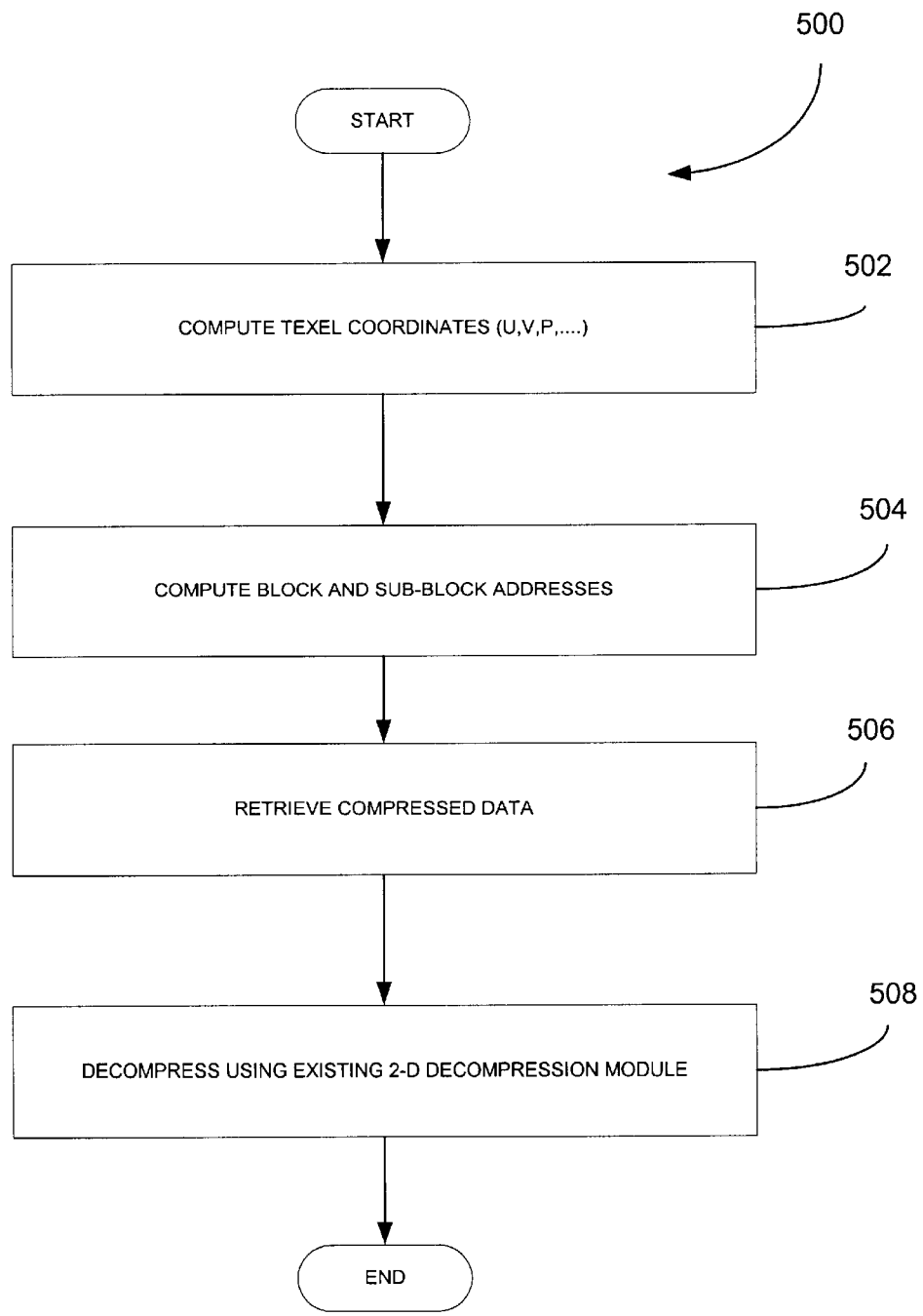
FIG. 5 is a flowchart illustrating an example of operation in accordance with one embodiment of the present invention.

FIG. 5 is a flowchart illustrating an example of operation 500 in accordance with one embodiment of the present invention. As shown, in operation 502, texture coordinates corresponding to predetermined texels required may be computed for performing texture operations in a computer graphics pipeline. Such texture coordinates take the form of u, v, p, etc. coordinates which are known in the art, as is the manner in which they are conventionally computed.

Thereafter, in operation 504, a sub-block address associated with the texture coordinates may be computed. Table I illustrates exemplary equations for calculating the addresses. As shown, the sub-block ordering within the block is from smaller to larger depth values. Given a texel coordinate (e.g. u, v, p, etc.) in the ranges $u \in \{0,1, \ldots, \text{width}-1\}$, $v \in \{0, 1, \ldots, \text{height}-1\}$, $p \in \{0, 1, \ldots, \text{depth}-1\}$, the equations of Table 1 may be used to compute the corresponding address of the compressed sub-blocks in memory containing that texel. As mentioned above, the sub-block format matches the existing DXTn format.

TABLE 1

| | |
|---|---|
| subblock_size = | for DXT1, 8; for DXT2. .DXT5, 16 |
| block_size = | MIN(p, 4) * subblock_size |
| horiz_stride = | (width + 3) >> 2 |
| planar_stride = | ( (height + 3) >> 2) * horiz_stride |
| block_byte_address = | ( (p >> 2) * planar_stride + (v >> 2) * horiz_stride + (u >> 2) ) * block_size |
| subblock_byte_address = | block_byte_address + ( (p & 3) * subblock_size) |

Using the computed address, the appropriate memory sub-block may be retrieved in operation 506. Further, the sub-block may be decompressed using known algorithms for accessing the predetermined texels. Note operation 508.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-readable medium containing a compressed data structure for efficient storage of texture data in memory for use with a computer graphics pipeline, comprising:

(a) at least one compressed sub-block representing a group of texels in a predetermined image plane and at predetermined locations in a first and a second dimension in a texture map; and (b) wherein a number of the sub-blocks corresponds with a depth of texture data in the texture map.

2. A computer-readable medium as set forth in claim 1, wherein the group of texels includes no more than four (4) texels spanning in the first dimension and four (4) texels spanning in the second dimension.

3. A computer-readable medium as set forth in claim 1, wherein the number of the sub-blocks is selected from the group consisting of one (1), two (2), three (3), four (4), and a positive multiple of 4.

4. A computer-readable medium as set forth in claim 1, wherein the sub-blocks together define a memory block with an associated block address.

5. A computer-readable medium as set forth in claim 4, wherein the sub-blocks each have an associated sub-block address.

6. A computer-readable medium as set forth in claim 1, wherein each memory sub-block is adapted for being decompressed individually.

7. A computer-readable medium as set forth in claim 6, wherein each memory sub-block is adapted for being decompressed individually by hardware equipped to decompress two-dimensional texture data.

8. A method for efficient retrieval of texture data stored in a data structure including at least one compressed sub-block representing a group of texels in a predetermined image plane and at predetermined locations in a first and a second dimension in a texture map, wherein a number of the sub-blocks corresponds with a depth of texture data in the texture map, the method comprising:

computing texture coordinates corresponding to predetermined texels required for performing texture operations in a computer graphics pipeline;

computing an address of at least one of the compressed sub-blocks associated with the texture coordinates;

retrieving the at least one compressed sub-block using the address; and decompressing the at least one retrieved compressed sub-blocks for accessing the predetermined texels.

9. A method as set forth in claim 8, wherein the group of texels includes no more than four (4) texels spanning in the first dimension and four (4) texels spanning in the second dimension.

10. A method as set forth in claim 8, wherein the number of the sub-blocks is selected from the group consisting of one (1), two (2), three (3), four (4), and a positive multiple of 4.

11. A method as set forth in claim 8, wherein the sub-blocks together define a memory block with an associated block address.

12. A method as set forth in claim 11, wherein the sub-blocks each have an associated sub-block address.

13. A method as set forth in claim 12, wherein each memory sub-block is adapted for being decompressed individually.

14. A method as set forth in claim 12, wherein each memory sub-block is adapted for being decompressed individually by hardware equipped to decompress two-dimensional texture data.

15. A computer program embodied on a computer readable medium for efficient retrieval of texture data stored in a data structure including at least one compressed sub-block representing a group of texels in a predetermined image plane and at predetermined locations in a first and a second dimension in a texture map, wherein a number of the sub-blocks corresponds with a depth of texture data in the texture map, the method comprising:

(a) a code segment for computing texture coordinates corresponding to predetermined texels required for performing texture operations in a computer graphics pipeline;

(b) a code segment for computing an address of at least one of the compressed sub-blocks associated with the texture coordinates;

(c) a code segment for retrieving the at least one compressed sub-block using the address; and (d) a code segment for decompressing the at least one retrieved compressed sub-blocks for accessing the predetermined texels.

16. A computer program as set forth in claim 15, wherein the group of texels includes no more than four (4) texels spanning in the first dimension and four (4) texels spanning in the second dimension.

17. A computer program as set forth in claim 15, wherein the number includes one (1).

18. A computer program as set forth in claim 15, wherein the number includes two (2).

19. A computer program as set forth in claim 15, wherein the number includes three (3).

20. A computer program as set forth in claim 15, wherein the number includes four (4).

21. A computer program as set forth in claim 15, wherein the number includes a multiple of four (4).

22. A method for efficient retrieval of texture data stored in a data structure including at least one compressed sub-block representing a group of texels in a predetermined image plane and at predetermined locations in a first and a second dimension in a texture map, the method comprising:

computing texture coordinates corresponding to predetermined texels required for performing texture operations in a computer graphics pipeline;

computing an address of at least one of the compressed sub-blocks associated with the texture coordinates;

retrieving the at least one compressed sub-block using the address; and decompressing the at least one retrieved compressed sub-blocks for accessing the predetermined texels;

wherein the group of texels includes no more than four (4) texels spanning in the first dimension and four (4) texels spanning in the second dimension;

wherein a plurality of the sub-blocks together define a block with an associated block address, and the sub-blocks each have an associated sub-block address;

wherein each sub-block is adapted for being decompressed individually by hardware equipped to decompress two-dimensional texture data;

wherein a number of the sub-blocks matches a depth of texture data in the texture map and is selected from the group consisting of one (1), two (2), three (3), four (4), and a positive multiple of 4,where each of the sub-blocks is spaced along a depth direction.

* * * * *